United States Patent
Kewitsch

(10) Patent No.: US 11,199,662 B2
(45) Date of Patent: Dec. 14, 2021

(54) ULTRA-SCALABLE, MULTI-TIERED, ROBOTIC FIBER OPTIC CROSS-CONNECT UTILIZING TRUNK LINE PHYSICAL AGGREGATION

(71) Applicant: TELESCENT INC., Irvine, CA (US)

(72) Inventor: Anthony Stephen Kewitsch, Santa Monica, CA (US)

(73) Assignee: TELESCENT INC., Irvine, CA (US)

( * ) Notice: Subject to any disclaimer, the term of this patent is extended or adjusted under 35 U.S.C. 154(b) by 0 days.

(21) Appl. No.: 16/543,233

(22) Filed: Aug. 16, 2019

(65) Prior Publication Data

US 2020/0041725 A1  Feb. 6, 2020

Related U.S. Application Data

(63) Continuation-in-part of application No. 16/378,266, filed on Apr. 8, 2019, which is a continuation of application No. PCT/US2017/055789, filed on Oct. 9, 2017.

(60) Provisional application No. 62/406,060, filed on Oct. 10, 2016, provisional application No. 62/724,024, filed on Aug. 28, 2018.

(51) Int. Cl.
| G02B 6/36 | (2006.01) |
| G02B 6/28 | (2006.01) |
| H04B 10/25 | (2013.01) |
| H04B 10/27 | (2013.01) |

(52) U.S. Cl.
CPC ............... *G02B 6/28* (2013.01); *H04B 10/25* (2013.01); *H04B 10/27* (2013.01)

(58) Field of Classification Search
CPC ........ G02B 6/28; G02B 6/3556; H04B 10/25; H04B 10/27
See application file for complete search history.

(56) References Cited

U.S. PATENT DOCUMENTS

| 6,243,510 B1 | 6/2001 | Rauch |
| 6,335,992 B1 | 1/2002 | Bala et al. |
| 7,702,193 B2 | 4/2010 | Arol |
| 7,924,052 B1* | 4/2011 | Feng ................ H03K 19/17736 326/41 |
| 8,175,425 B2 | 5/2012 | Chen |
| 8,203,450 B2 | 6/2012 | German et al. |
| 8,369,321 B2* | 2/2013 | Aybay .................... H04L 49/00 370/388 |

(Continued)

FOREIGN PATENT DOCUMENTS

| KR | 10-2007-0103365 A | 10/2007 |
| WO | 2018071341 | 4/2018 |

OTHER PUBLICATIONS

USPTO, Non-final Office action for U.S. Appl. No. 16/378,266, filed Aug. 17, 2020. 13 pages.

(Continued)

*Primary Examiner* — Ellen E Kim
(74) *Attorney, Agent, or Firm* — Siritzky Law, PLLC

(57) ABSTRACT

Apparatus and methods to cross-connect large numbers of fiber optic ports using a multi-tiered fiber interconnection system incorporating physical aggregation are disclosed. Robotic reconfiguration of multi-fiber trunk lines enables scalability and software management from hundreds of connections up to and including 100,000 connections. Examples of two-tiered automated cross-connect systems are described.

17 Claims, 10 Drawing Sheets

(56) References Cited

U.S. PATENT DOCUMENTS

| 8,805,155 | B2 | | 8/2014 | Kewitsch | |
|---|---|---|---|---|---|
| 9,225,666 | B1 | * | 12/2015 | Aybay | ................ H04L 49/25 |
| 9,411,108 | B2 | | 8/2016 | Kewitsch | |
| 2005/0031250 | A1 | | 2/2005 | Schroeder | |
| 2005/0275504 | A1 | | 12/2005 | Torza | |
| 2007/0036480 | A1 | | 2/2007 | Wu | |
| 2010/0046885 | A1 | * | 2/2010 | Chen | ................ G02B 6/3508 |
| | | | | | 385/22 |
| 2013/0294723 | A1 | * | 11/2013 | Kewitsch | ............ G02B 6/4452 |
| | | | | | 385/17 |
| 2015/0331199 | A1 | | 11/2015 | Kewitsch | |
| 2016/0202424 | A1 | * | 7/2016 | Kewitsch | ............... B25J 18/025 |
| | | | | | 385/17 |
| 2019/0056553 | A1 | | 2/2019 | Kewitsch | |
| 2019/0293875 | A1 | | 9/2019 | Kewitsch | |
| 2020/0359117 | A1 | | 11/2020 | Kewitsch | |

OTHER PUBLICATIONS

WIPO, Written Opinion of the International Searching Authority from International Application No. PCT/US2017/055789, dated Feb. 5, 2018. (11 pages).

WIPO, International Search Report from International Application No. PCT/US2017/055789, dated Feb. 5, 2018. (4 pages).

WIPO, International Preliminary Report on Patentability for International Application No. PCT/US2017/055789, dated May 7, 2019. (1 page).

WIPO, International Search Report, dated Apr. 2, 2021, for PCT/US2020/035776 (3p.).

WIPO, Written Opinion of the International Searching Authority, dated Apr. 2, 2021, for PCT/US2020/035776 (12p.).

* cited by examiner

FIG. 3
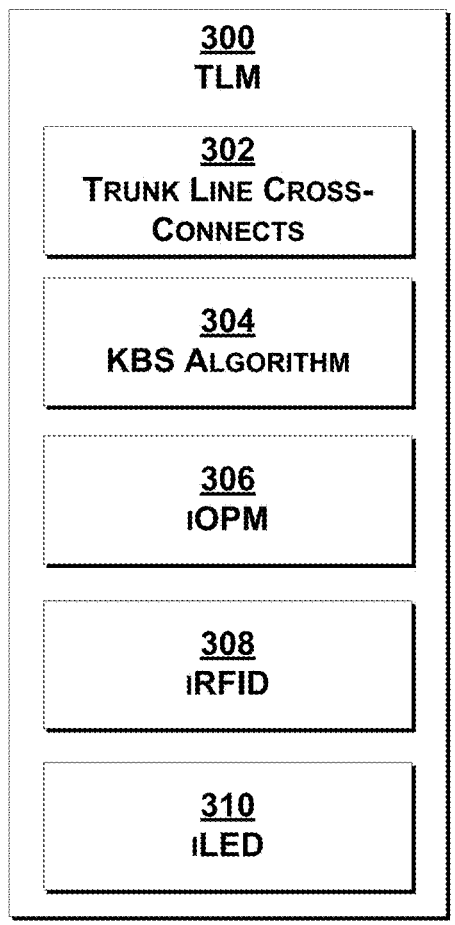
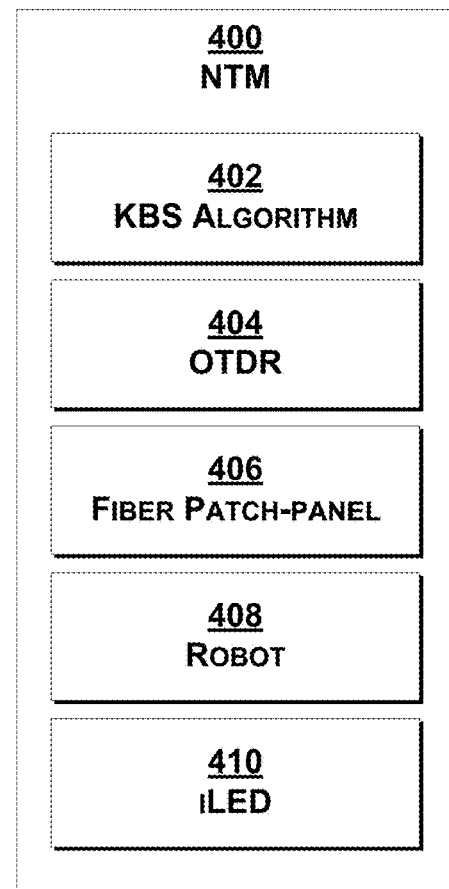
FIG. 4

ULTRA-SCALABLE, MULTI-TIERED, ROBOTIC FIBER OPTIC CROSS-CONNECT UTILIZING TRUNK LINE PHYSICAL AGGREGATION

RELATED APPLICATION

This application claims the benefit of U.S. provisional patent application No. 62/724,024, filed Aug. 28, 2018, the entire contents of which are hereby fully incorporated herein by reference for all purposes.

This application is a continuation-in-part (CIP) of U.S. patent application Ser. No. 16/378,266, filed Apr. 8, 2019, which is a continuation of PCT/US17/55789, filed Oct. 9, 2017 which claims the benefit of U.S. Provisional Application 62/406,060, filed Oct. 10, 2016, the entire contents of each of which are hereby fully incorporated herein by reference for all purposes.

FIELD OF THE INVENTION

This invention relates to distributed, large scale communication systems comprised of fiber optic cables to transmit illumination and/or signals. More particularly, this invention relates to a multi-tiered robotically reconfigurable interconnection system comprised of large numbers of fiber optic cables aggregated into trunk lines under software control.

BACKGROUND

Current automated all-fiber cross-connects have non-blocking simplex port counts numbering up to about 4,000 per rack and are called Network Topology Managers (NTMs) (see, e.g., U.S. Pat. No. 8,068,715 to Kewitsch). To increase port counts by orders of magnitude, robotic Trunk Line Managers (TLMs) have been disclosed in a previous patent application to Kewitsch (PCT/US17/55789, published as WO/2018/071341).

A TLM is a cross-connect with over 1,000 reconfigurable connectors, each cross-connect corresponding to a 12-fiber bundle and terminated in 12-fiber MPO, MTP, MDC, mini-SC, or equivalent small form factor connector. A three-axis robot within the TLM executes a fiber bundle reconfiguration path computed by the non-tangling Knots, Braids and Strands routing algorithm (U.S. Pat. No. 8,463,091 to Kewitsch). This approach enables the multi-fiber connectors to be arbitrarily moved and reconfigured, so that the 12-fiber trunk lines internal to the TLM (and interconnecting all NTMs) can be arbitrarily reconfigured. This TLM adds a second tier to the NTM cross-connect fabric and extends non-blocking scalability up to about 12,000 fibers for systems utilizing 12-fiber connectors within a single rack. Multiple racks can be deployed for larger switch fabrics. A block diagram of this approach is illustrated in FIG. 1 (depicting an exemplary two-tiered architecture 100 for 2,16 duplex any-to-any scaling to 12K duplex any-to-any). This example is comprised of two NTMs 102-1, 102-2 and two automated TLMs 104-1, 104-2 to reconfigure the trunk lines therebetween. One TLM switches the Tx (Transmit Line) ports, while another TLM switches the Rx (Receive Line) ports. This system can be scaled incrementally to over 12,000 ports, supporting any arbitrary interconnection state. While the TLM is fully automated, it is challenging to scale to port counts higher than about 24,000. With the continued growth in complexity and scale of fiber optic networks beyond 24,000, a further extension of the NTM and TLM two-tiered system design is necessary, to increase scalability by an additional order of magnitude to about 100,000 fibers.

SUMMARY

The present invention is specified in the claims as well as in the below description. Preferred embodiments are particularly specified in the dependent claims and the description of various embodiments.

A multi-tiered automated cross-connect system implementing trunk line physical aggregation to build highly scalable, automated, non-blocking cross-connect fabrics is disclosed. Each tier aggregates input physical channels by, for example, a factor of 12, to scale from 1,000 non-blocking ports at tier 1, 12,000 ports at tier 2, and 144,000 ports at tier 3.

Some presently preferred exemplary embodiments hereof provide an incrementally scalable, two-tiered non-blocking cross-connect system for use in large scale data centers and central offices. This exemplary system may utilize multiple NTMs at tier 1, with, for example, 504 and 1,008 duplex ports in the input side and 12-fiber trunk lines on the output side. The trunk lines may terminate at the large scale TLM cross-connect with an MT-ferrule based connector. A trunk line cross-connect interconnecting separate NTMs may be configured under software control by adding trunk line jumpers at the TLM trunk line cross-connect panel. These jumpers may be configured to support arbitrary non-blocking connectivity between all NTMs in a massively scalable approach that can be reconfigured incrementally without interrupting service, enabling the network to grow as evolving network traffic demands change in both individual fiber and bulk trunk line connectivity.

In a further aspect hereof, a management software system may orchestrate the configuration of the non-blocking cross-connect fabric comprised of multiple robotically reconfigured interconnects and software guided, automatically or manually reconfigured bulk interconnects. Bulk interconnects refer herein to the multi-fiber trunk lines comprised of, e.g., 6, 12, 24, ... 144 or more individual fibers that may be reconfigured as a group.

By consideration of an appropriate reservation overhead to manage anticipated growth, the software-driven process of reconfiguring trunk lines jumpers is relatively infrequent (e.g. 12 months) and may be scheduled deterministically. Trunk line reconfiguration may then be done manually, while still realizing much of the benefit of fully automated provisioning and re-provisioning.

Incremental scalability is a key benefit of the cross-connect system disclosed herein. Trunk lines between every tier 1 and tier 2, and similarly between any potential higher-level tiers, may be added incrementally. For instance, for the first NTM deployed, approximately half of the trunk lines may be pre-configured as "hairpins" connecting outputs to outputs at the TLM. This supports any-to-any connectivity across the first NTM. Once these ports are exhausted, a second NTM may be deployed and its trunk lines may be connected to unused ports on the same TLM. About half the fibers may be configured for any-to-any connectivity across the second NTM and half the fibers configured for any-to-any connectivity to the first NTM. Individual channels in the first and second NTMs may be robotically reconfigured as demands dictate. This creates a non-blocking switch fabric between the first and second NTMs, up to the point of trunk line exhaustion, at which point, additional trunk line jumpers must be installed if further expansion is required. This system automates the reconfiguration of interconnects, supporting arbitrary reconfiguration of individual channels/fibers/ports.

In accordance with aspects hereof, the need to reconfigure trunk lines jumpers may be relatively infrequent (annually) and deterministically scheduled by proper consideration of the appropriate reservation overhead to manage anticipated growth. The trunk line jumpers in the TLM at tier 2 may typically be 12-fiber MPO patch-cords of fixed length, say two meters, to reach any location within the single bay. However, the TLM can also scale across multiple racks for essentially a limitless incremental expansion capability. This approach provides an advantageous tradeoff of automation versus cost, while providing incremental and practically unlimited scalability. By periodically grooming the trunk line jumpers as port counts scale, arbitrary large non-blocking switch fabrics may be configured using a substantially automated process requiring minimal human intervention.

One general aspect includes a two-tiered, hierarchical fiber optic cross-connect system to establish and manage non-blocking, low insertion loss interconnects between a large number of input single channel interconnects using a combination of single channel and multi-channel fiber optic connectors. The system may include a lower tier of automated fiber optic patch-panels including a very high number of robotically reconfigurable single channel interconnects, each interconnect with a connector attached to the inputs of one or more automated patch-panel frames. The system may also include an upper tier including a significantly reduced number of reconfigurable multi-channel interconnects, with multi-fiber connections terminated on the multi-fiber inputs of one or more cross-connect frames. The system may also include a number of intermediate trunk lines totaling less than a fraction of the number of input single channel interconnects, connecting the outputs of the lower tier to the inputs of the upper tier with intermediate multi-channel trunk lines. The system may also include where the multi-channel jumpers are configured to connect pairs of multi-channel output ports on the cross-connect frame, such that intermediate multi-channel trunk lines are established between automated patch-panel frames, so that any input single channel interconnect can be connected to any other input single channel interconnect.

Implementations or embodiments may include one or more of the following features, alone or in combination:

The system where the single channel connectors are in the family of fiber optic connectors including LC, SC, or equivalent.

The system where the multi-channel connectors are MPO, mini-MPO, mini-CS, MDC type with MT ferrules or equivalent.

The system where the outer diameter of multi-channel interconnects is less than 1 mm and include 6, 12 or 24 optical fibers. Another general aspect includes a multi-tiered, massively scalable, automated non-blocking fiber cross-connect system for data centers, comprised of a multiplicity of automated patch-panels in tier 1, that interconnect individual input channels to data center equipment and aggregate outputs into 12-fiber trunk lines; and a multiplicity of patch-panels in high tiers, that reconfigure and aggregate input multi-channel trunk lines by a factor of twelve to 144-fiber trunk lines, supporting 12,000 ports in tier 2 and 144,000 ports in tier 3.

Below is a list of system embodiments. Those will be indicated with a letter "S". Whenever such embodiments are referred to, this will be done by referring to "S" embodiments.

S1. A multi-tiered fiber cross-connect system comprising:
  a first multiplicity of automated patch panels in a first tier, wherein outputs of said automated patch panels are aggregated into first multi-fiber trunk lines; and
  a second multiplicity of second patch panels in second one or more tiers higher than said first tier, wherein said second patch panels configure and connect input first multi-fiber trunk lines to second multi-fiber trunk lines.

S2. The system of embodiment(s) S1, wherein second one or more tiers includes said first multi-fiber trunk lines comprised of m-fiber trunk lines and said second multi-fiber trunk lines comprised of n-fiber trunk lines, where n=m and first and second trunk lines are connected by patch panels.

S3. The system of embodiment(s) S2, wherein values of n and m are selected from 6, 12, 24, and 144.

S4. The system of any of the embodiment(s) S2 or S3, wherein multi-fiber trunk lines are comprised of m individual jacketed fibers with individual connectors at a first trunk line end which interfaces to tier 1 automated patch panels, and
  wherein said m individual jacketed fibers are aggregated into a single jacketed cable along its length, and wherein said single jacketed cable is comprised of m individual fibers.

S5. The system of any of the embodiment(s) S1-S4, wherein said single jacketed cable interfaces to second tier patch-panels with a single multi-fiber connector at a second trunk line end.

S6. The system of any of the embodiment(s) S1-S5, wherein said first multi-fiber trunk lines have a corresponding first outer diameter of less than 1 mm; and said second multi-fiber trunk lines have a corresponding second outer diameter of less than 1 mm S7. The system of any of the embodiment(s) S2 to S6, wherein said second patch panels configure input first multi-fiber trunk lines to said second multi-fiber trunk lines by a factor of m.

S8. The system of any of the embodiment(s) S2 to S7, wherein n−m=12, and wherein said one or more tiers higher than said first tier comprise a second tier, and wherein said system supports 12,000 ports in said second tier.

S9. The system of any of the embodiment(s) S1 to S8, wherein said one or more tiers higher than said first tier comprise a third tier higher than said second tier, and wherein said system supports 144,000 ports in said third tier.

S10. The system of any of the embodiment(s) S1 to S9, wherein said first multiplicity of automated patch panels in said first tier interconnect individual input channels to data center equipment and aggregate said outputs into said first multi-fiber trunk lines.

S11. The system of any of the embodiment(s) S1 to S10, wherein said first multiplicity of automated patch panels include a first number of robotically reconfigurable single channel interconnects.

S12. The system of any of the embodiment(s) S11, wherein at least some of said single channel interconnects have a corresponding connector attached to one or more inputs of one or more automated patch-panel frames.

S13. The system of any of the embodiment(s) S11 or S12, wherein the single channel interconnects comprise fiber optic connectors selected from: LC (Lucent Connector) connectors, SC connectors.

S14. The system of any of the embodiment(s) S1 to S13, wherein said one or more tiers comprise:
an upper tier having a second number of reconfigurable multi-channel interconnects, with multi-fiber connections terminated on multi-fiber inputs of one or more cross-connect frames,
wherein said second number is less than said first number.

S15. The system of any of the embodiment(s) S1 to 14, wherein multi-channel connectors comprise connectors selected from: MPO (Mechanical Pull-Out) connectors, mini-MPO connectors, mini-CS connectors, and MDC (Mini Duplex Connector) type connectors with MT (mechanical transfer) ferrules.

S16. The system of any of the embodiment(s) S1 to S15, further comprising:
a third number of intermediate trunk lines connecting outputs of the first tier to inputs of the upper tier with intermediate multi-channel trunk lines.

S17. The system of any of the embodiment(s) S16, wherein the third number is less than a fraction of said first number of robotically reconfigurable single channel interconnects.

S18. The system of any of the embodiment(s) S16 to S17, wherein said intermediate multi-channel trunk lines connect pairs of multi-channel output ports on cross-connect frame.

S19. The system of any of the embodiment(s) S16 to S18, wherein intermediate multi-channel trunk lines are established between automated patch-panel frames, so that any input single channel interconnect can be connected to any other input single channel interconnect.

The above features along with additional details of the invention, are described further in the examples herein, which are intended to further illustrate the invention but are not intended to limit its scope in any way.

BRIEF DESCRIPTION OF THE DRAWINGS

Objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIG. 3 illustrates a block diagram of the functional elements within a TLM according to exemplary embodiments hereof;

FIG. 4 illustrates a block diagram of the functional elements within the NTM according to exemplary embodiments hereof;

DETAILED DESCRIPTION OF THE PRESENTLY PREFERRED EXEMPLARY EMBODIMENTS

Glossary and Abbreviations

Figure 1:
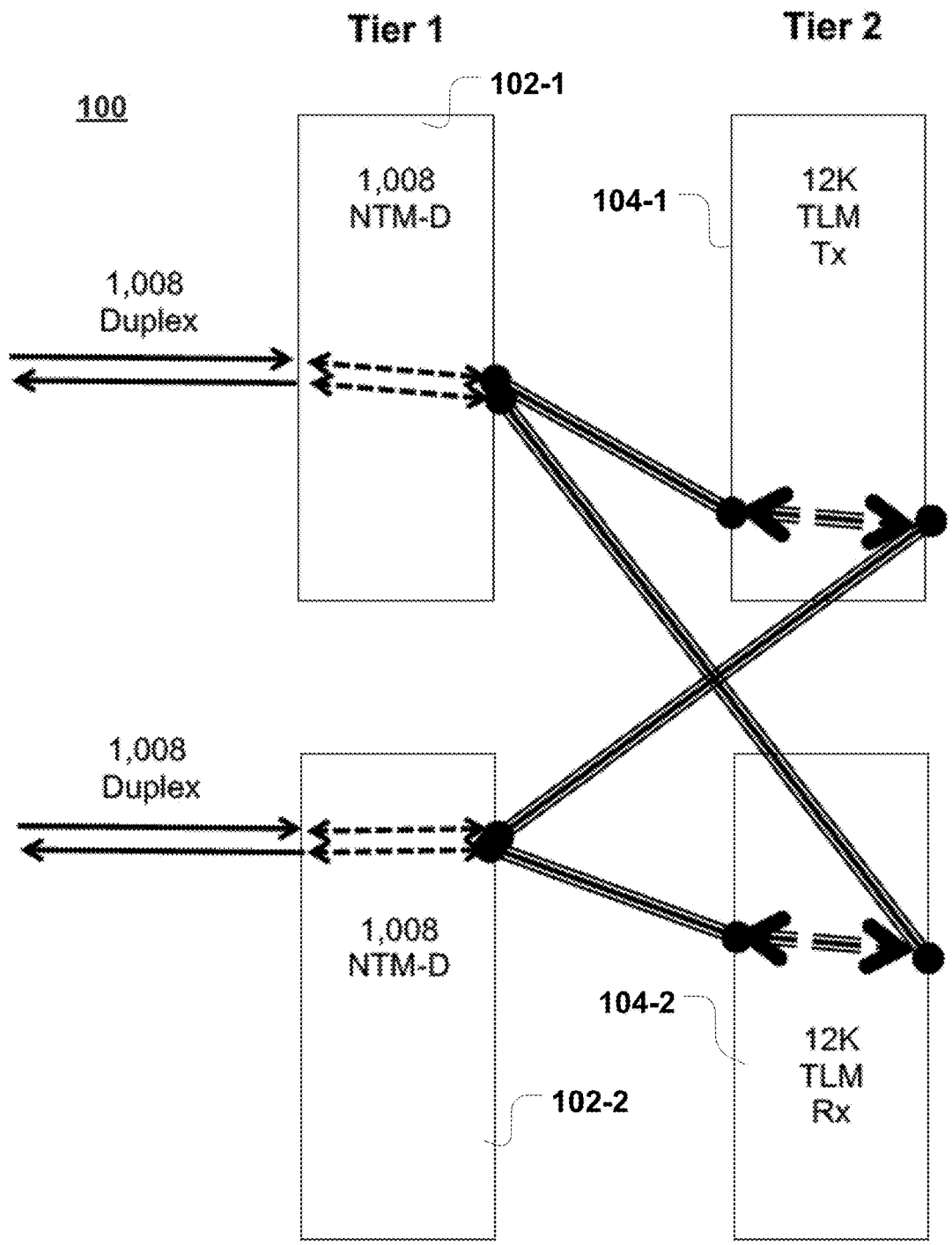
FIG. 1 illustrates a block diagram of a fully automated system of NTMs interconnected via TLMs.

As used herein, unless used otherwise, the following terms or abbreviations have the following meanings, or the meanings given in the glossary at the end of this description:
iOPM means In-line Optical Power Meter;
iLED means Indicating Light Emitting Diode;
KBS means Knots, Braids and Strands;
LC means Lucent Connector;
MPO means Mechanical Pull-Out Connector;
MT means mechanical transfer;
MT Ferrule means Multi-fiber Ferrule;
MDC means Mini Duplex Connector;
NTM means Network Topology Manager;
OTDR means Optical Time Domain Reflectometer;
RFID means radio frequency identification;
TLM means Trunk Line Manager;
Tx means Transmit Line; and
Rx means Receive Line.

Description

In accordance with exemplary embodiments, a multi-tiered cross-connect system comprised of multiple NTMs and a central TLM cross-connect is disclosed, which scales incrementally up to 144,000 cross-connects. The lower tier of NTMs may be robotically reconfigured. Depending on use case and growth patterns, the higher tiers of the interconnect fabric may or may not be robotically reconfigured. Significant operational benefits can be achieved while minimizing cost, by automating only the lowest tier. In a particular example of a two-tiered physical cross-connect system, the NTMs may be in the lower tier and the TLM is in the upper tier(s), wherein the upper tier(s) aggregate multiple fibers terminated by a single connector and reconfigured as a group. Specifically, individual fibers from equipment may be connected to the inputs of the NTMs. The NTM outputs may be interconnected with bulk, multi-channel/multi-fiber trunk lines that may be reconfigured as a unit at the TLM(s). A number of trunk lines may be pre-provisioned at the time of NTM and TLM install, providing the reserved ports to support the subsequent automated provisioning of a pre-determined number of cross-connects over a given period (e.g. 6 months).

The bulk interconnections between NTMs and TLMs, and the individual interconnections between NTMs and network elements, may be installed in a highly flexible manner tailored for each network application. For example, 12-fiber trunk lines may be spliced to the rear side of the NTM and the client interfaces may be attached to the front, reconfigurable side of the NTM. In a particular example, the NTM may have 12-fiber ribbons at fixed ends that may be ribbon fusion spliced to these trunk lines. As illustrated schematically in FIG. 2B (depicting an exemplary two-tiered architecture supporting duplex any-to-any scaling up to 100K), the use of splicing in a two-tiered approach can reduce the total number of fiber optic connector interfaces (e.g. sources of insertion loss) along the optical path from six to four. A non-fusion spliced version would have two additional connector interfaces. The maximum insertion loss is about 2.0 dB for four connector interfaces, and 3.0 dB for six connector interfaces. This assumes a maximum value of 0.5 dB per connector.

Depending on the particular example or configuration, the NTMs may be single fiber (NTM-S) and/or double fiber (NTM-D) versions. An NTM in which fibers may be reconfigured by the robot individually and sequentially is a single fiber NTM-S. In contrast, an NTM in which a fiber pair may be reconfigured together and in parallel is a double fiber NTM-D. Both single and double fiber NTMs (NTM-S and/or NTM-D) may coexist within the same automated cross-connect fabric and they may provide identical functionality and maximum scalability. However, the double fiber version, typically used for unidirectional transmission over fiber pairs, has higher density and reduces reconfiguration time by a factor of two (since two fibers of the duplex pair may be reconfigured by a robot together and at the same time).

Note that the double fiber version as a stand-alone, single tier cross-connect enables any ports of type A to be arbitrarily interconnected to any ports of type B, while the single fiber version as a stand-alone unit enables full any A-to-any-A connectivity, but for only half the total number of ports. As used herein, type A describes a first group of ports with specific characteristics (e.g. top of rack switch) and type B describes a second group of ports (e.g. fabric switch) with is potentially different characteristics.

Bulk trunk lines may be rebalanced incrementally at the front side of the TLM as additional NTMs are deployed. When the reserved fibers in trunk lines reach a level too low to support anticipated growth, or as connectivity demands shift across different cross-connect domains, trunk lines may need to be added or rebalanced.

In a further example, the trunk line cross-connect may incorporate 12-channel, in-line optical power monitors within the optical path, based on microwire detector arrays on thin flexible substrates (see U.S. Pat. No. 7,289,197) and/or tap photodiodes sandwiched between MPO connectors. These detectors utilize, for example, ITO patterned on a very thin (<100 microns) glass or plastic film, in which the ITO microwires intersect the optical fiber cores and absorb a small <5% fraction of the optical power transmitted through the core region, to produce the highly localized heating effect. This enables real time average optical power monitoring across a wide range of infrared wavelengths, for all connections within the system. In a further example, the optical power monitor may be integrated with the MPO connector of a trunk line jumper, with the electrical connector adjacent to MPO connector. The detector element may be in-line with each interconnect and may add approximately 0.25 dB to 0.5 dB total insertion loss.

In a further example, the truck line cross-connect may include port verification LEDs, passive RFID tag reader antenna, and in-line optical power monitor for each 12-fiber port. The MPO connector adapter panels may be PCBA (Printed Circuit Board Assembly) cards that plug into an electrical backplane. The backplane may include an Ethernet interface with verification LED power and control, and in-line optical power monitor interface and readout electronics. Below is an example of the fiber interconnection process steps to incrementally scale with a fully non-blocking interconnect fabric:

1) Install NTM #1 with 1,008 duplex ports
   a. Install 1,008 devices to front of NTM
   b. Connect 84 12-fiber trunk line cables to TLM
   c. Periodically (e.g., based on usage), a software planning tool may instruct a technician to install 12-fiber 3 mm OD length trunk line jumpers connecting NTM between each pair of flashing ports.
   d. Software system validates connection through RFID overlay
   e. Software system validates link loss though OTDR and generates dark fiber test report
   f. NTM #1 will perform fully automated cross-connects using reserved trunk lines.
2) Install NTM #2 with 1,008 duplex ports
   a. Install 1,008 devices to front of NTM
   b. Connect 84 12-fiber trunk line cables to TLM
   c. Periodically (based on usage), a software planning tool will instruct technician to install 12-fiber, 3 mm OD length trunk line jumpers connecting NTMs between each pair of flashing ports.
   d. System validates connection through RFID overlay
   e. Software system validates link loss though OTDR and generates dark fiber test report
   f. NTM #1, #2 will perform fully automated cross-connects using reserved trunk lines.
3) Repeat process above for NTM #N Key advantages of this fiber optic cross-connect system include:
1) Trunk line jumpers may be added enabling a pay-as-you grow approach to allow future port expansion
2) Trunk line racks may be added incrementally
3) NTMs may be added incrementally
4) Trunk line jumpers may be instrumented with optional RFID and in-line optical power monitoring capability to achieve advanced software control, guidance, and monitoring.

In a further example, software control of the cross-connect system may be provided by an automated physical network planning tool that specifies the reconfiguration of trunk line jumpers, determines an optimal fill factor of each NTM, alerts an operator when to pre-provision additional reserved trunk lines, and determines a selection and order of ports to provision based on available resources and constraints. The system may also provide physical network troubleshooting tools to alert the operator to any connectivity issues, such as excess insertion loss.

Port scaling examples are disclosed below for both duplex unidirectional and bidirectional single fiber transmission, based on a utilization metric corresponding to a maximum trunk line reservation overhead of about 11%. This reservation overhead is the maximum fraction of individual fiber lines that may be empty at any one time due to unused lines within the reserved trunk lines. The unused trunk lines provide the capacity to provision some number of new connections within the constraints of the currently installed and reserved trunk lines. It is advantageous to keep the reservation overhead to less than 20%.

EXAMPLE 1

To Scale Up to 12K Ports in Two-Tiered System, the System is Comprised of 1,000-port NTMs;
12-fiber trunk lines;
12,000 total ports;
12 NTMs; and
1,000 MPO port TLM.

EXAMPLE 2

To Scale Up to 24K Ports in Two-Tiered System, the System is Comprised of

Approach A:
1,000-port NTMs;
6-fiber trunk lines;
24,000 total ports;
24 NTMs; and
4,000 MPO port TLM.
Approach B:
2,000-port NTMs;
12-fiber trunk lines;
24,000 total ports;
12 NTMs; and
2,000 MPO port TLM.

EXAMPLE 3

To Sale Up to 48K Ports in Two-Tiered System, the System is Comprised of 2,000-port NTMs;
6-fiber trunk lines;
48,000 total ports;
24 NTMs; and
8,000 MPO port TLM.

Figure 2A:
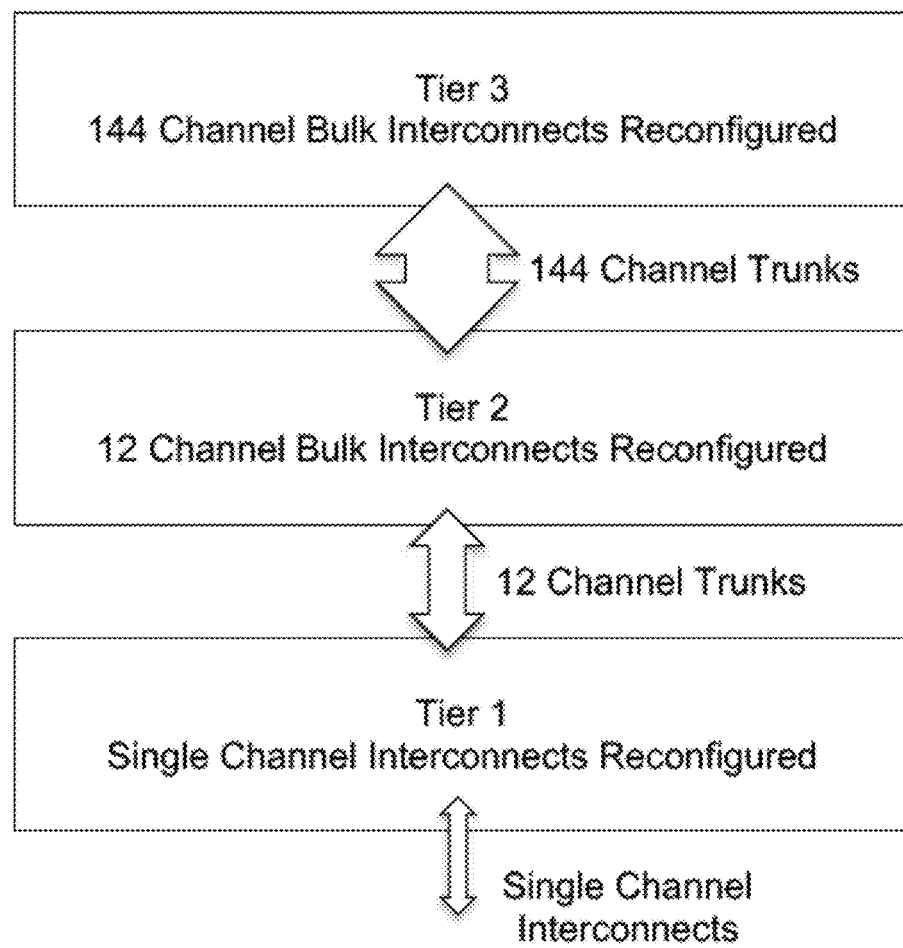
FIG. 2A illustrates a general block diagram of a multi-tiered cross-connect system utilizing trunk line aggregation according to exemplary embodiments hereof.
Figure 2B:
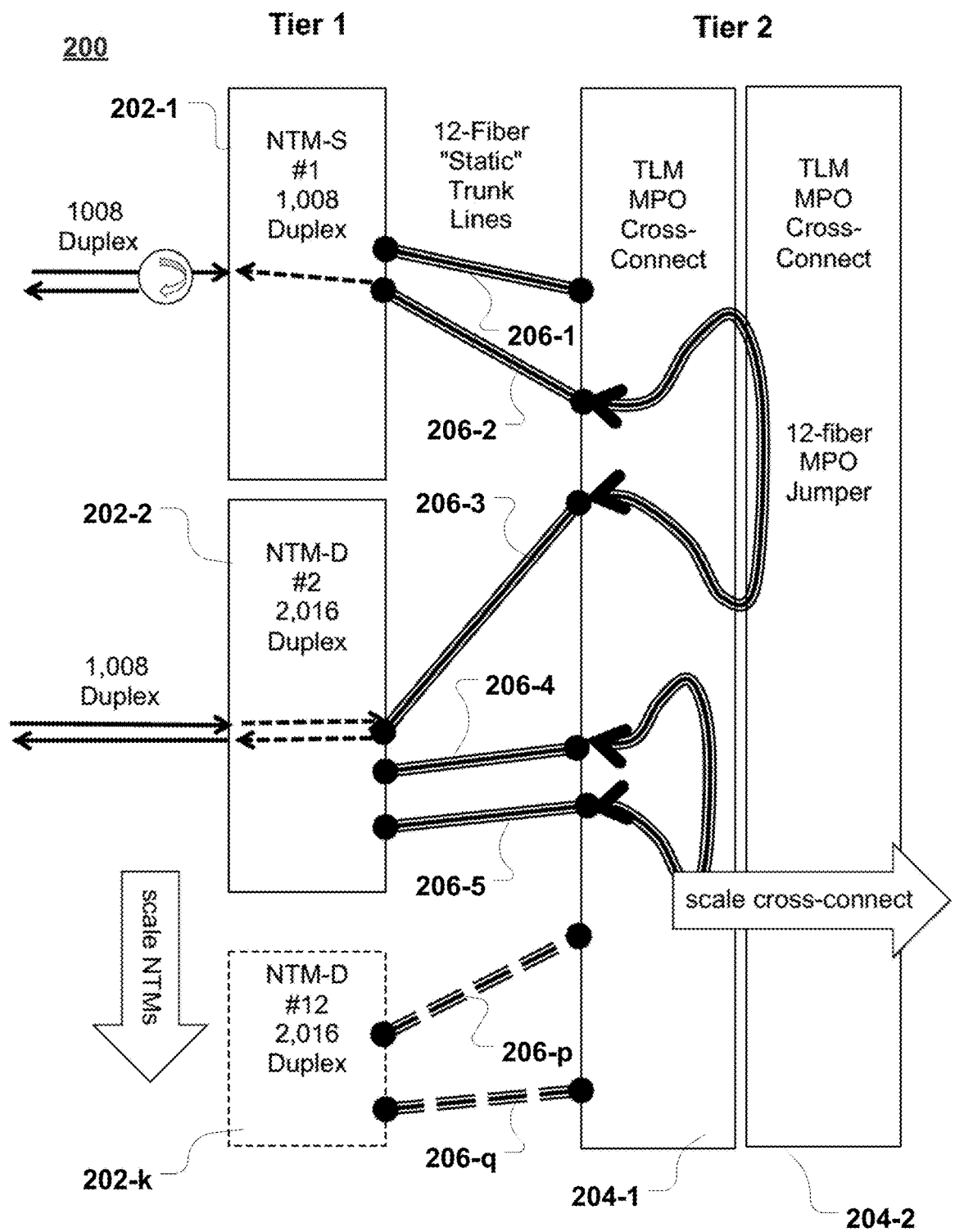
FIG. 2B illustrates a block diagram of an exemplary two-tiered system of NTMs with reconfigurable trunk lines interconnecting therebetween and connected to a TLM cross-connect with MPO (Mechanical Pull-Out) connectors.

In a further example, FIG. 2B is a diagram of a massively scalable non-blocking interconnection system 200, comprised of multiple NTMs (denoted 202-1, 202-2 . . . 202-k) and a TLM 204-1 with trunk line jumpers (generally denoted 206-j for the j-th trunk line jumper, collectively 206) that configure the interconnectivity of NTMs for arbitrary any-to-any connectivity. As the TLM 204-1 potentially spans several racks, trunk line jumpers 206 should extend across multiple racks to provide essentially unlimited scalability.

FIG. 3 is a block diagram of a manual TLM 300, comprised of trunk line jumpers 302, the KBS algorithm 304, in-line optical power monitoring (iOPM) 306, RFID port identification 308, and LED indicating lights 310. Trunk lines typically have 6, 12, or 24 fibers each and may be terminated in multi-fiber connectors such as MPO or MTP. Similarly, FIG. 4 is a block diagram of an NTM 400, comprised of the KBS algorithm 402, an integral OTDR 404, a collection of fiber interconnects at a fiber optic patch-panel 406, and a robot 408. The NTM 400 may also include LED indicating lights 410. The NTM enables any individual fiber or fiber pair to be cross connected within the system.

Figure 5:
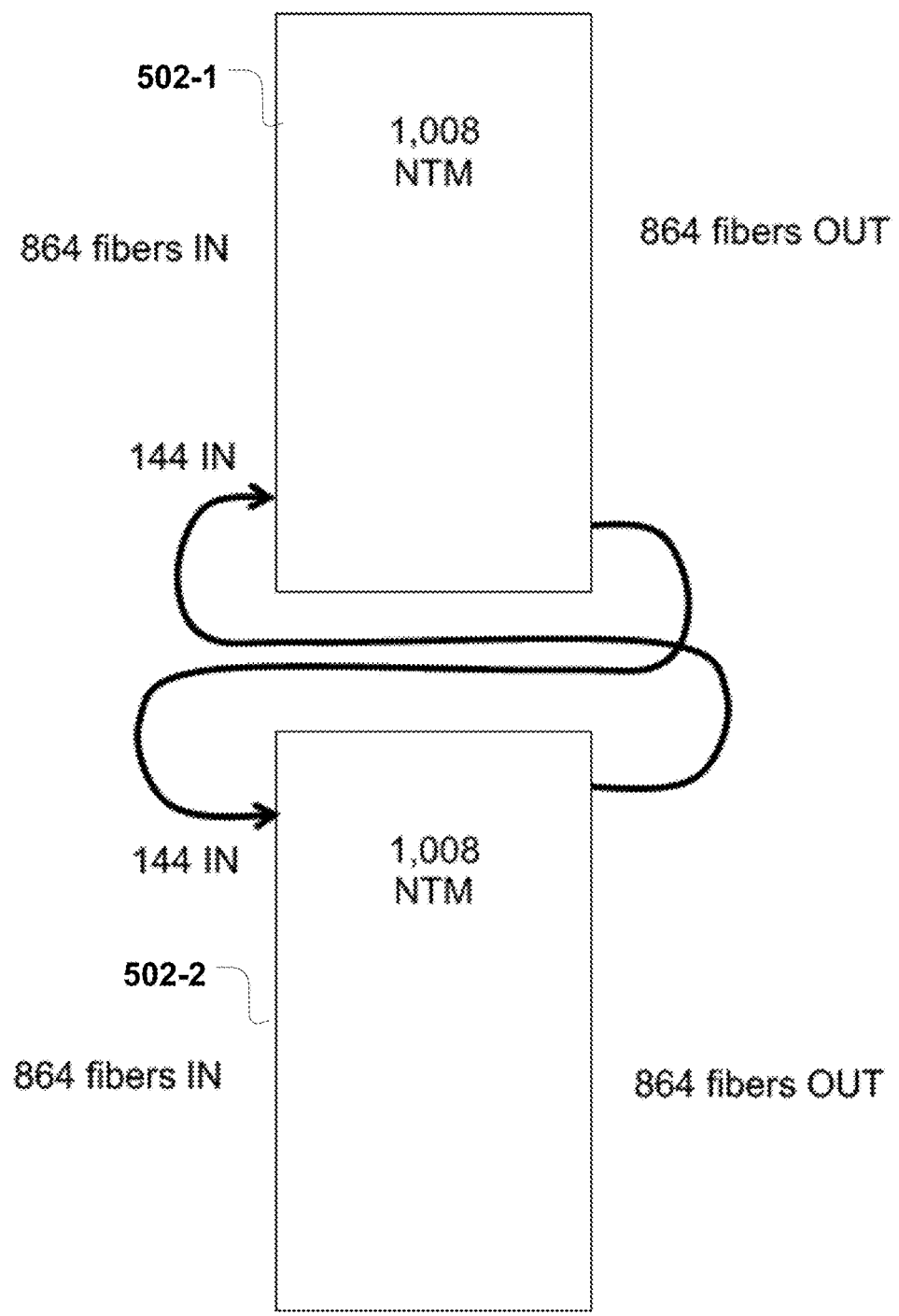
FIG. 5 illustrates a block diagram with direct connection of trunk lines between two NTMs to provide 144 trunk lines.
Figure 6:
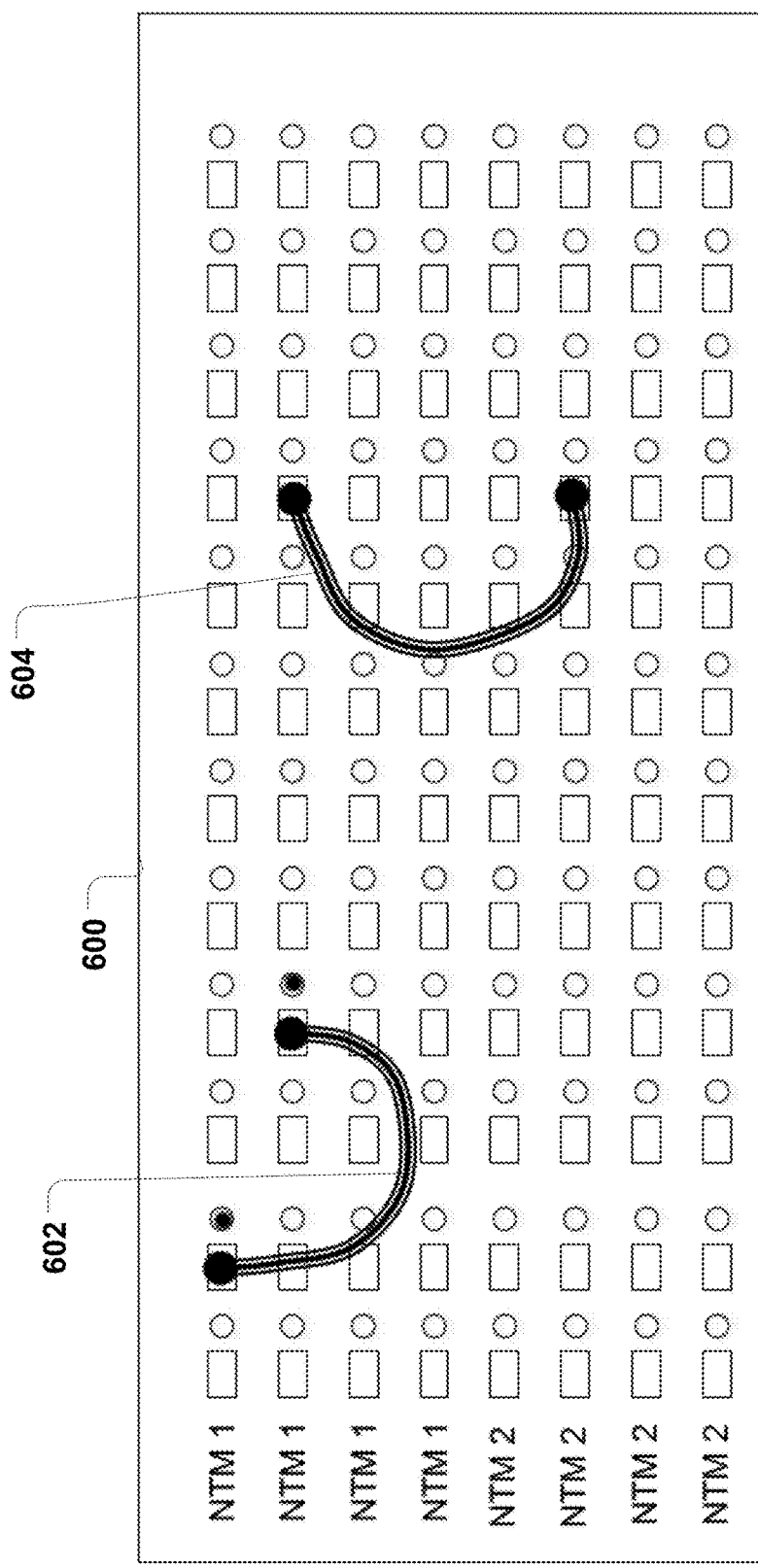
FIG. 6 is a schematic diagram of MPO patch-panel according to exemplary embodiments hereof, with indicating LEDs, to provide software guidance during the trunk line jumper installation, and potentially high-resolution RFID tags to discover and automatically track the state of inter-NTM trunk lines.

Several specific examples of NTMs and TLMs, including a single tier implementation, are further disclosed. FIG. 5 illustrates two 1,008-port NTMs (502-1, 502-2) in an any-to-any configuration with trunk lines comprised of 144 individual fibers connected therebetween. This system bypasses the TLM to reduce cost, but limits port scalability to a single digit multiple of 1,008 ports. In a further example of a single tier implementation, FIG. 6 is a front diagram of the manual TLM 600, in which trunk line jumpers 602, 604 with 12-fibers each may be used to connect ports from NTM 1 back to NTM 1, or from NTM 1 to NTM 2. This system is shown for comparison as a relatively small-scale cross-connect with about 2,000 ports.

Figure 7:
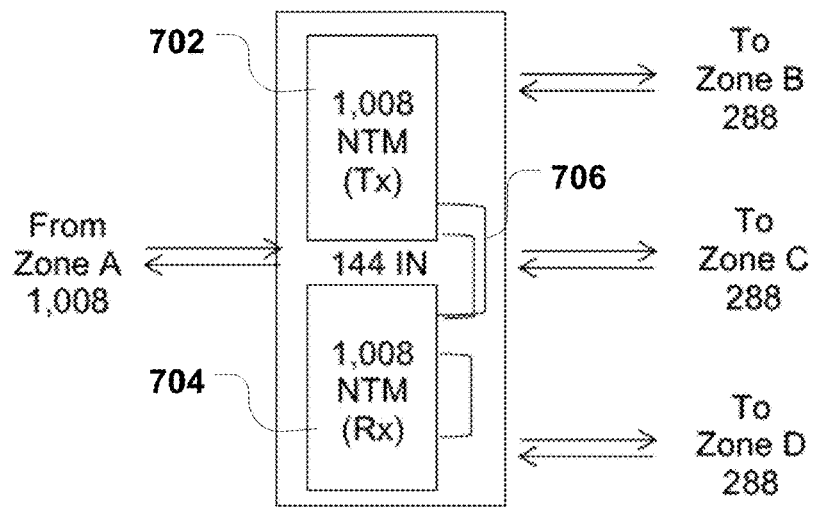
FIG. 7 illustrates a block diagram of exemplary NTM and TLM system combinations.

Alternatively, FIG. 7 illustrates two 1,008-port NTMs 702, 704 with a number of (e.g. 12) trunk lines 706 connecting the NTMs, wherein the trunk lines enable non-blocking connectivity for a predetermined number of ports to extend across a single NTM to two NTMs. This example illustrates 864 inputs and 864 outputs, wherein the 864 outputs may be subdivided and directed to three different locations (denoted Zones B, C, and D in the drawing), each location served by 288 fibers. In this example, half the ports do not need to be allocated for the trunk lines, thereby increasing the density of the system. Only 144 ports may be reserved for inter-NTM connectivity.

Figure 8:
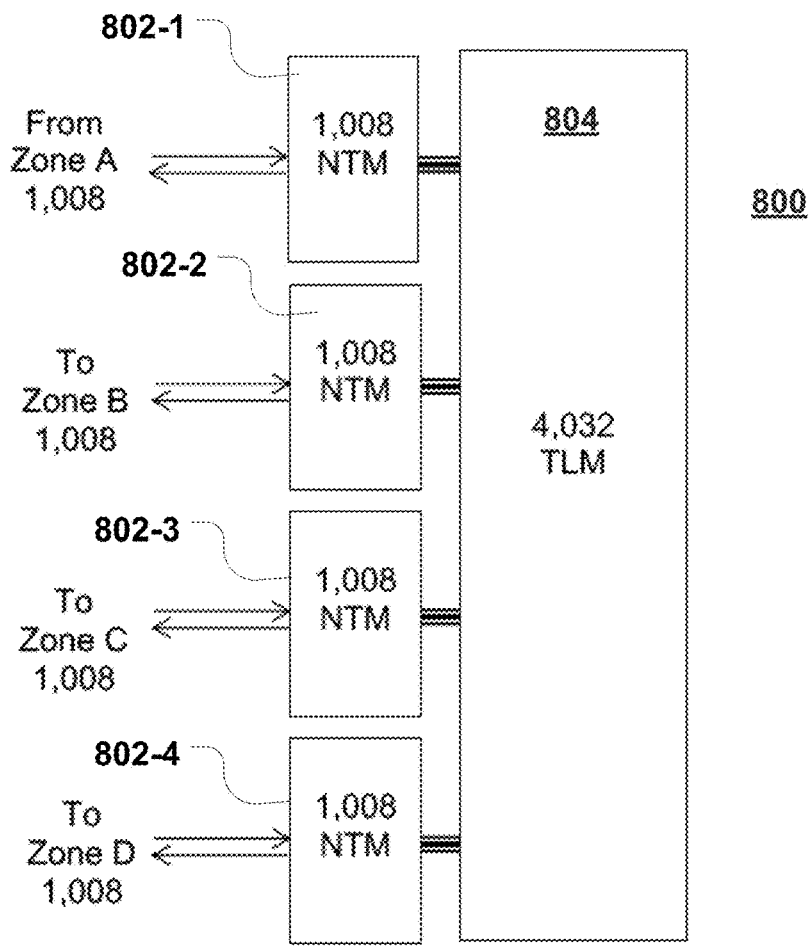
FIG. 8 illustrates a block diagram of exemplary NTM and TLM system combinations.
Figure 9:
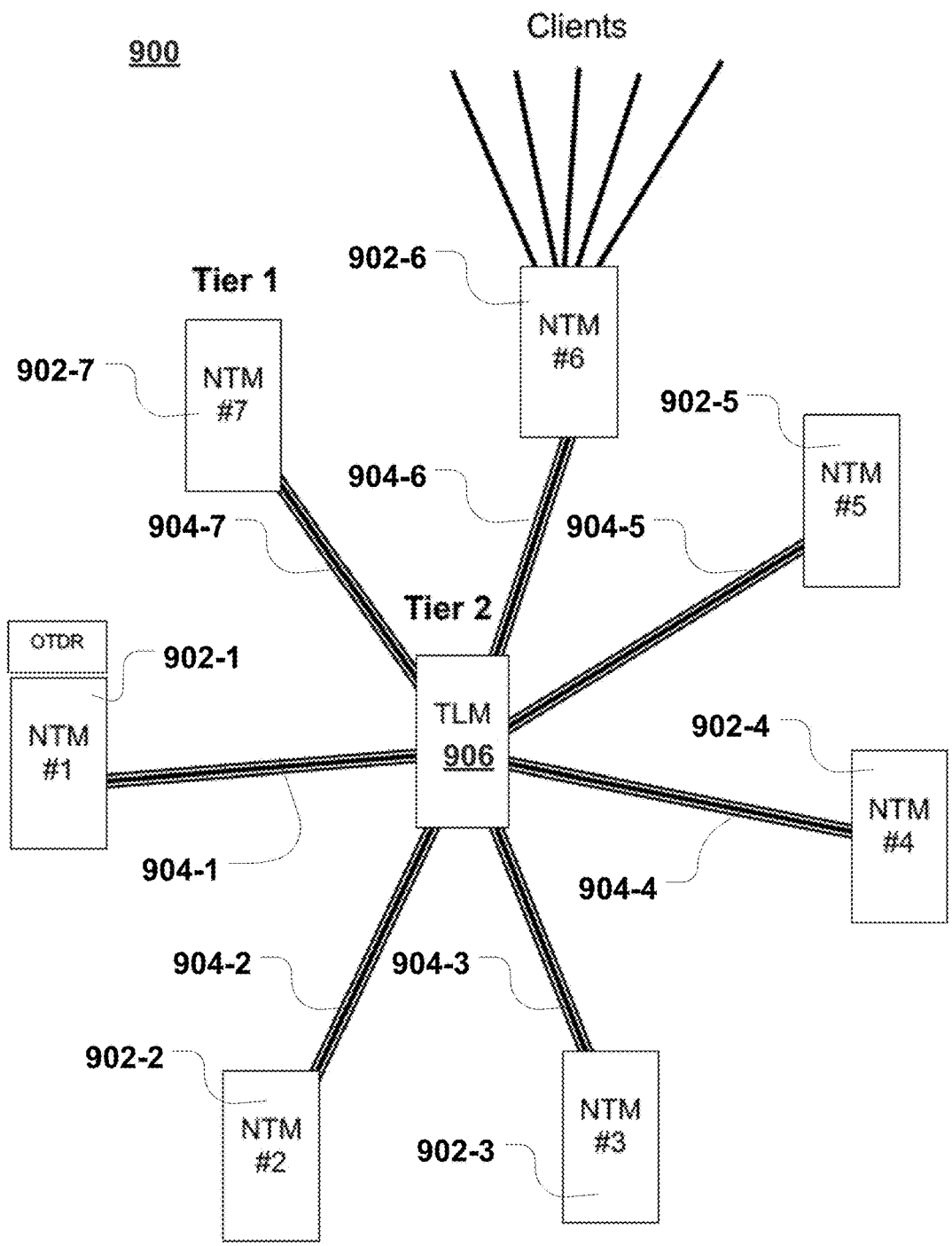
FIG. 9 illustrates NTMs and a central TLM in a hub-and-spoke configuration according to exemplary embodiments hereof.

Alternatively, FIG. 8 illustrates an example of a two-tiered cross-connect implementation 800, utilizing four 1,008-port NTMs 802-1, 802-2, 802-3, 802-4 is (collectively and individually NTMs/NTM 802) connected to a TLM 804 that enables arbitrary connectivity between any-and-all ports of the NTMs 802. The TLM 804 receives the 12-fiber trunks from each NTM 802. The NTM and TLM architecture supports a range of interconnectivity configurations. FIG. 9 illustrates a further example, a hub-and-spoke configuration 900 of seven NTMs 902-1, 902-2 . . . 902-7 in communication with and interconnected via trunk lines 904-1, 904-2 . . . 904-7 to a centralized TLM 906 that manages the any-to-any provisioning of trunk lines therebetween. All fibers entering the NTMs may be combined into multi-fiber trunk lines, the trunk lines converge to a common TLM which provides the trunk line connections between NTMs. Each spoke corresponds to a different interconnect domain in a different data center hall, for example.

Figure 10:
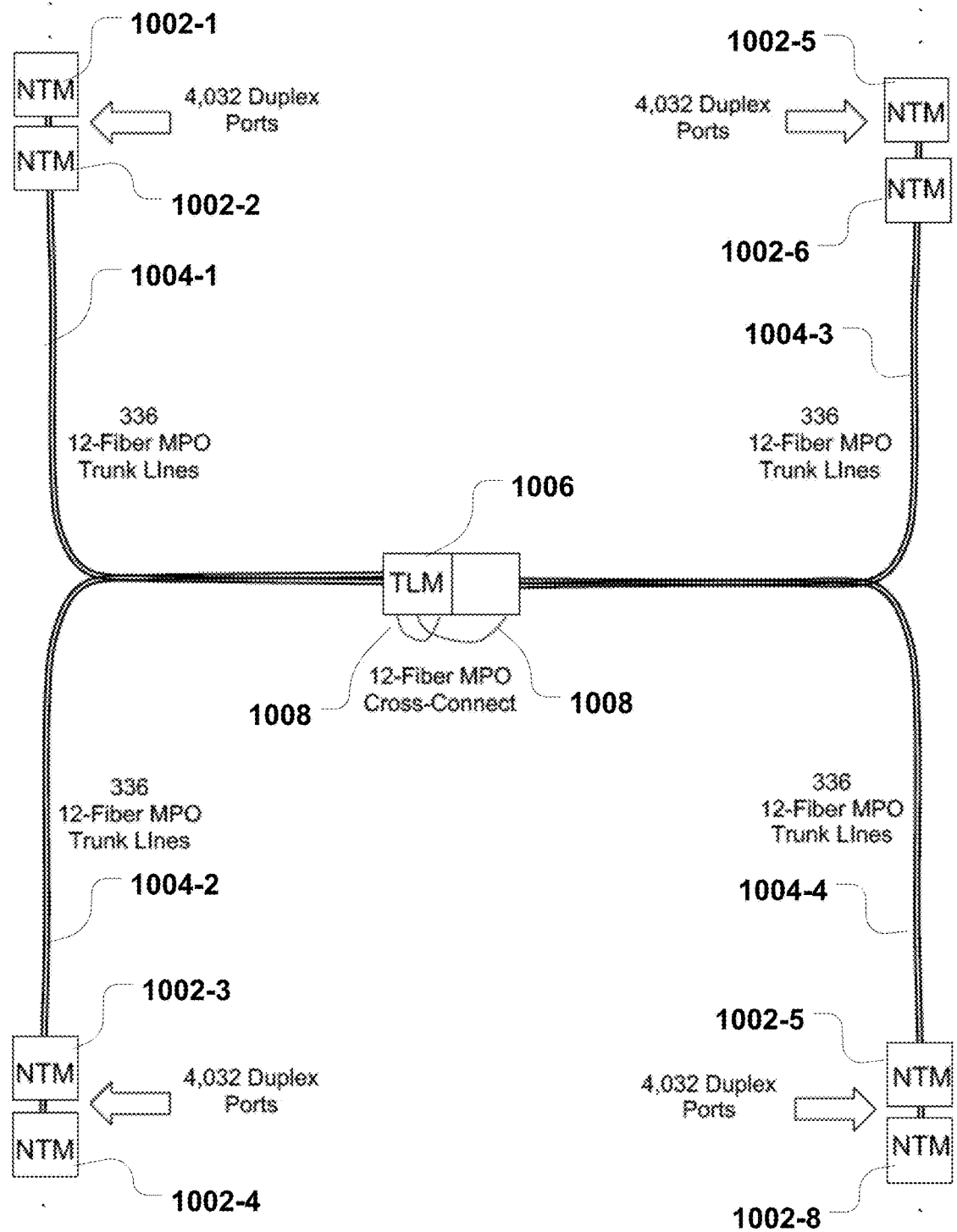
FIG. 10 illustrates a system diagram of multiple NTMs with trunk lines connected and cross-connected in multiples of 12-fiber trunk lines at the centralized TLM.

FIG. 10 illustrates a network diagram of a further example of multiple NTMs 1002-1, 1002-2 . . . (collectively 1002) at the ends of trunk lines 1004-1, 1004-2 . . . (collectively 1004), wherein the trunk lines converge on a common TLM 1006 that may span multiple racks, such that trunk line jumpers 1008 at the TLM 1006 provide the desired connectivity between NTMs 1002 to provide non-blocking connectivity across the network. In this particular example, the NTMs 1002 at each network node endpoint have 4,032 ports, and 12-fiber trunk lines 1004 connect the backside connections of each of these NTMs 1002 to the common TLM 1006.

Miniature, High Density Trunk Line Example

Figure 11:
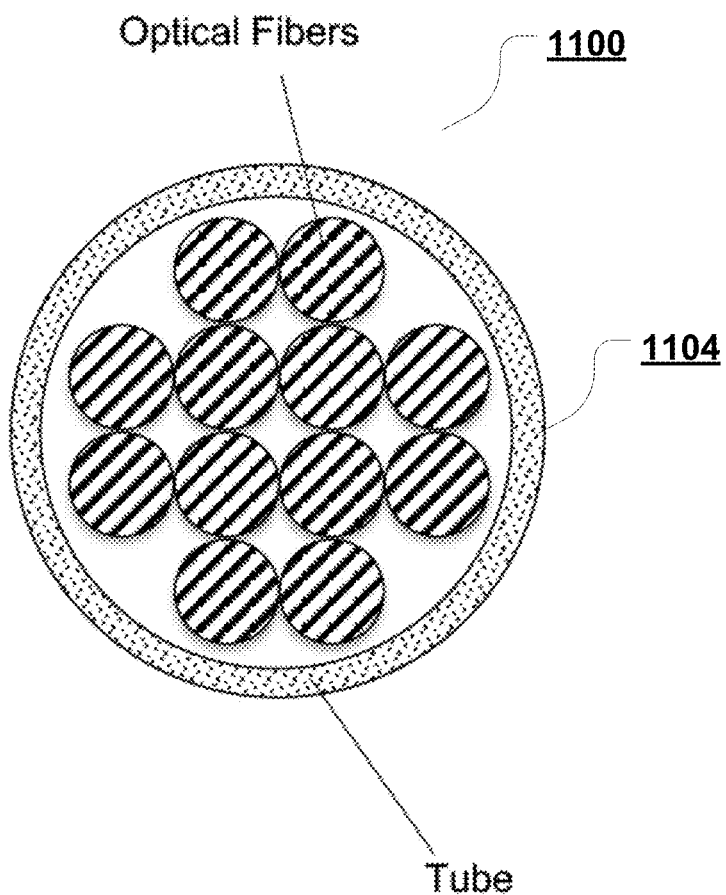
FIG. 11 illustrates an exemplary miniaturized 12-fiber trunk line in cross-section to enable a high density automated TLM according to exemplary embodiments hereof.

In a further example, FIG. 11 illustrates a cross-section of a miniaturized 12-fiber trunk line 1100. This exemplary trunk line is comprised of twelve colinear, individual glass optical fibers with 80-micron outer cladding diameter, encased within a common polymer plastic tube of about 500-600 microns outer diameter. The twelve fibers may be circle packed in a 4×4 array, with the 4 corner fibers absent, as shown, resulting in a minimum fiber bundle diameter that is four times the individual fiber diameter. By stripping the coating using mechanical or chemical means, the twelve individual glass fiber elements can be separated out and bonded individually within 80-micron diameter holes of a precision MT/MPO ferrule. This trunk line construction enables a highly compact TLM to be produced.

MT is an acronym for mechanical transfer and the MT ferrule is a multi-fiber polymer composite structure containing typically 6, 12 or 24 fibers. The precision of individual fiber alignment (and resulting insertion loss) is determined by the eccentricity and pitch of the fiber and alignment pin holes within the MT ferrule. MPO is the industry acronym for "multi-fiber push-on." The MPO-style connectors are most commonly defined by two different documents: IEC-61754-7 is the commonly referenced standard for MPO connectors, and EIA/TIA-604-5, also known as FOCIS 5, is the most common standard cited in the US.

Conclusion

Where a process is described herein, those of ordinary skill in the art will appreciate that the process may operate without any user intervention. In another embodiment, the process includes some human intervention (e.g., a step is performed by or with the assistance of a human).

As used in this description, including in claims, the term "portion" means some or all. So, for example, "A portion of P" may include some of "P" or all of "P". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "using" means "using at least," and is not exclusive. Thus, e.g., the phrase "using Z" means "using at least Z." Unless specifically stated by use of the word "only," the phrase "using Z" does not mean "using only Z."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means "X is at least partially distinct from Y," and does not mean "X is fully distinct from Y." Thus, as used herein, including in the claims, the phrase "X is distinct from Y" means that X differs from Y in at least some way.

It should be appreciated that the words "first," "second," "third," and so on, in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent, or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

Reference numerals have just been referred to for reasons of quicker understanding and are not intended to limit the scope of the present invention in any manner.

Those skilled in the art will readily observe that numerous modifications and alterations of the device may be made while retaining the teachings of the invention. Accordingly, the above disclosure should be construed as limited only by the metes and bounds of the appended claims.

I claim:

1. A multi-tiered fiber cross-connect system comprising:
a first multiplicity of automated patch panels in a first tier, wherein outputs of said automated patch panels are aggregated into first multi-fiber trunk lines; and
a second multiplicity of second patch panels in second one or more tiers higher than said first tier, wherein said second patch panels configure and connect input first multi-fiber trunk lines to second multi-fiber trunk lines,
wherein said first multi-fiber trunk lines are comprised of m individual jacketed fibers or fiber pairs with individual connectors for each individual fiber or fiber pair at a first trunk line end which interfaces to first tier automated patch panels, wherein said m individual jacketed fibers or fiber pairs are aggregated into a single jacketed cable along its length, and wherein said single jacketed cable is comprised of individual fibers or fiber pairs, and wherein said single jacketed cable interfaces to second tier patch-panels with a single multi-fiber connector for greater than two fibers at a second trunk line end, and
wherein said second multi-fiber trunk lines are comprised of m individual jacketed fibers aggregated into a single jacketed cable along its length with single multi-fiber connectors at each trunk line end which interface to said second patch panels, and
wherein said first multiplicity of automated patch panels include a first number of robotically reconfigurable individual interconnects.

2. The system of claim 1, wherein first and second trunk lines are connected by said second patch panels.

3. The system of claim 1, wherein said first multi-fiber trunk lines have a corresponding first outer diameter of less than 10 mm; and said second multi-fiber trunk lines have a corresponding second outer diameter of less than 10 mm.

4. The system of claim 1, wherein m=12, and wherein said one or more tiers higher than said first tier comprise a second tier, and wherein said system supports 12,000 ports in said second tier.

5. The system of claim 4, wherein said one or more tiers higher than said first tier comprise a third tier higher than said second tier, and wherein said system supports 144,000 ports in said third tier.

6. The system of claim 1, wherein said first multiplicity of automated patch panels in said first tier interconnect individual input fibers to data center equipment.

7. The system of claim 1, wherein at least some of said interconnects have a corresponding connector attached to one or more inputs of one or more automated patch-panel frames.

8. The system of claim 1, wherein the interconnects comprise fiber optic connectors selected from: LC (Lucent Connector), SC, CS, SN, MDC, MT, and MU connectors.

9. The system of claim 1, wherein said one or more tiers higher than said first tier comprise:
an upper tier having a second number of reconfigurable multi-fiber interconnects, with multi-fiber connections terminated on multi-fiber inputs of one or more cross-connect frames,
wherein said second number is less than said first number.

10. The system of claim 9, wherein multi-fiber connectors comprise connectors selected from: MPO (Mechanical Pull-Out) connectors, mini-MPO connectors, CS connectors, and MDC (Mini Duplex Center) type connectors with MT (mechanical transfer) multi-fiber ferrules.

11. The system of claim 9, further comprising:
a third number of intermediate trunk lines connecting outputs of the first tier to inputs of the upper tier with intermediate multi-fiber trunk lines.

12. The system of claim 11, wherein the third number is less than a fraction of said first number of robotically reconfigurable interconnects.

13. The system of claim 11, wherein said intermediate multi-fiber trunk lines connect multiple pairs of output ports at a third tier of patch panels.

14. The system of claim 11, wherein intermediate multi-fiber trunk lines are established between automated patch-panels, so that any input individual interconnect can be connected to any other input individual interconnect.

15. The system of claim 11, wherein said intermediate trunk lines are comprised of m individual jacketed fibers aggregated into a single jacketed cable along its length with single multi-fiber connectors at each trunk line end.

16. The system of claim 1, wherein m is 6 to 144.

17. The system of claim 16, wherein m is selected from 6, 12, 24, and 144.

* * * * *